(12) United States Patent
Xiao et al.

(10) Patent No.: US 11,653,625 B2
(45) Date of Patent: May 23, 2023

(54) PORTABLE WATER BOTTLE FOR PET

(71) Applicant: Leshwo Rocity (Shenzhen) Industrial Co., Ltd., Shenzhen (CN)

(72) Inventors: WeiJun Xiao, Shenzhen (CN); FangJian Zhang, Shenzhen (CN)

(73) Assignee: LesoRocity (Shenzhen) Industrial Co., Ltd., Guangdong (CN)

( * ) Notice: Subject to any disclaimer, the term of this patent is extended or adjusted under 35 U.S.C. 154(b) by 77 days.

(21) Appl. No.: 17/020,807

(22) Filed: Sep. 15, 2020

(65) Prior Publication Data
US 2021/0051920 A1    Feb. 25, 2021

Related U.S. Application Data

(63) Continuation-in-part of application No. 16/550,269, filed on Aug. 25, 2019, now Pat. No. 11,304,404.

(51) Int. Cl.
*A01K 7/00*    (2006.01)
*A45F 3/16*    (2006.01)

(52) U.S. Cl.
CPC . *A01K 7/00* (2013.01); *A45F 3/16* (2013.01)

(58) Field of Classification Search
CPC .................................. A01K 7/00; A45F 3/16
USPC ........................................................... 119/72
See application file for complete search history.

(56) References Cited

U.S. PATENT DOCUMENTS

| | | | |
|---|---|---|---|
| 3,246,807 A * | 4/1966 | Micallef | G01F 11/286 222/207 |
| 4,757,922 A * | 7/1988 | Landecker | A45D 34/00 222/205 |
| D777,992 S * | 1/2017 | Tsengas | D30/129 |
| 9,894,879 B2 * | 2/2018 | Sanderson | A47G 19/2266 |
| 10,028,484 B2 * | 7/2018 | Ross | A01K 7/00 |
| 2009/0159009 A1 * | 6/2009 | Parks | A01K 7/00 119/74 |

(Continued)

OTHER PUBLICATIONS

Amazon, Pet Water Bottle for Dogs with Foldable Water Dispenser, 2016, LESOTC (Year: 2016).*

*Primary Examiner* — Jennifer Robertson
*Assistant Examiner* — Eric C Baldrighi
(74) *Attorney, Agent, or Firm* — Raymond Y Chan; David and Raymond Patent Firm

(57) ABSTRACT

A portable water bottle for pet includes a flexible water bowl having a top opening and a bottom opening, a water switch unit, adapted to be switched to an open state or a close state to respectively allow or prevent passing through of water, and a flexible bottle having an opening. The top opening is arranged in an inclined and wide opening manner, wherein the bottom opening is arranged on the bottom of the flexible water bowl. The water switch unit is arranged on the bottom opening and coupled with the opening of the flexible bottle so as to control the output of the water in the flexible bottle to the flexible water bowl. When the flexible bottle is filled with water, the user may open the water switch unit, squeeze the flexible bottle to have the water pumped up into the flexible water bowl slowly, and incline the bottle in various angles to feed water for the pet. The user may also adjust and lock the water volume based on the needs. After the water feeding, the user may close the water switch unit and selectively flip and invert the flexible water bowl to fold and store it, so as to save the storage space.

20 Claims, 10 Drawing Sheets

(56) References Cited

U.S. PATENT DOCUMENTS

2015/0298867 A1\* 10/2015 Sanderson ......... A47G 19/2266
  215/6
2019/0373853 A1\* 12/2019 Price ..................... A01K 7/005

\* cited by examiner

PORTABLE WATER BOTTLE FOR PET

CROSS REFERENCE OF RELATED APPLICATION

This is a Continuation-In-Part application that claims the benefit of priority under 35 U.S.C. § 120 to a non-provisional application, application Ser. No. 16/550,269, filed Aug. 25, 2019, which claims the benefit of priority under 35 U.S.C. § 119 to a Chinese application number 201821475743.4, filed Sep. 10, 2018.

BACKGROUND OF THE PRESENT INVENTION

Field of Invention

The present invention relates to the field of pet supplies and products, and, more particularly, to a portable water bottle for pet.

Description of Related Arts

Conventional pet water feeding devices are unfriendly in feeding pets water, including drawbacks such as bulky water bowl and difficulties in storing and transportation. In addition, the conventional device is difficult in feeding water with multiple inclined angles and inconveniences in switching on to open and off to shut off the water feeding function, rendering difficulties for pets to drink water and for the pet owners to manage the utilization of the water bottle. As a result, the pet may stay thirsty and/or waste too much water due to the difficulty in accessing the water, causing water damage or pollution to the environment. To address the above two issues, conventional water devices merely provide a bigger bowl and require the pet owners to squat down on one or two knees so as to hold the water device as low as possible. As a result, the pet owners are forced to put more efforts in feeding water to their pets and carry a bulky device as mentioned above. Moreover, a portable water bottle, even for a conventional bulky one, can barely be simply place on the floor in order for the pet owner to stand up and rest because it is likely to be overturned by the pet especially when there is not much water in the lower/bottle part thereof. Consequently, the pet owner has to maintain squatting down and holding the water bottle and get his/her hand wet during the water feeding process since his/her hand is holding the water bottle right under the pet's mouth or take a high risk that the pet may overturn the water bottle, waste the water, and water damage/pollute the immediate environment.

In addition, some other conventional devices set the water switch in the water bowl, which requires the pet owners to open and close the water supply to the bowl through operating the switch by fingers, rendering contaminations between the pets and the pet owners. Germs or some other hazard materials may be passed from the pet owner fingers to the pets and vice versa, which increases health risks to both the pets and the pet owners.

Therefore, it is a desire to further improve the water bottle for pet so as for addressing the above and other drawbacks.

SUMMARY OF THE PRESENT INVENTION

The present invention provides a portable water bottle for pet, which addresses the above and other technical issues.

An advantage of the present invention is to provide a portable water bottle for pet, which has a flexible water bowl having an inclined bowl mouth, so as to allow the pet owner/user to simply and slightly bend down and hold the portable water bottle in an inclined manner to feed his/her pet water, which saves the effort of the user in feeding water to the pet as well as reduces the risk of the water and the pet's saliva dropping on the user's hand that is holding the portable water bottle.

Another advantage of the present invention is to provide a portable water bottle for pet, which has a flexible water bowl having an internal space defined therein with an adequate depth and shape, such that when the portable water bottle is held upright the depth allows a pet, such as a dog and etc., which licks to drink water, to access and drink the water contained in the internal space easily, so as to minimize the spill and create a better water feeding experiences for both the user and the pet.

Another advantage of the present invention is to provide a portable water bottle for pet, which has a flexible water bowl having an internal space defined therein with an adequate depth and shape, such that when the portable water bottle is held obliquely, thanks to the inclined bowl mouth, the depth of the internal space also allows a pet, such as a dog and etc., which licks to drink water, to access and drink the water contained in the internal space easily, so as to minimize the spill, minimize the user's effort, and create a better water feeding experiences for both the user and the pet.

Another advantage of the present invention is to provide a portable water bottle for pet, wherein the internal space and the inclined bowl mouth of the flexible water bowl allow the flexible water bowl to have a compact size while still serving the above functions.

Another advantage of the present invention is to provide a portable water bottle for pet, wherein the flexible water bowl is made of flexible material and can be selectively flipped and inverted, which allows the portable water bottle to become even more compact, so as to further facilitate the carrying and storing of the portable water bottle.

Another advantage of the present invention is to provide a portable water bottle for pet, which includes a flexible bottle and a water switch unit connected between the flexible water bowl and the flexible bottle and adapted to be switched to an open state or a close state to respectively allow or prevent passing through of water, which allows the user to control the water switch from the outside of the portable water bottle rather than from the inside of the flexible water bowl, so as to avoid contaminations between the pets and the pet owners.

In order to solve the above and other issues, the present invention provides a portable water bottle for pet, including:

a flexible water bowl having an upper rim, an internal space defined therein, a top opening, and a bottom opening;

a water switch unit, adapted to be switched to an open state or a close state to respectively allow or prevent passing through of water; and a flexible bottle having an opening, wherein the upper rim is arranged in an inclined manner that ensures the internal space to have at least a predetermined depth while the flexible water bowl is upright to oblique within a predetermined angle, wherein the bottom opening is arranged on the bottom of the flexible water bowl, wherein the water switch unit is arranged on the bottom opening and coupled with the opening of the flexible bottle so as to control the output of the water in the flexible bottle to the flexible water bowl.

According to one embodiment, the flexible water bowl includes a connecting member, arranged around the bottom opening, wherein the connecting member has an accommodating space defined therein for accommodating, covering, holding, and connecting the water switch unit and the opening of the flexible bottle.

According to one embodiment, the water switch unit includes a water output part having a nozzle arranged thereon, a water switch having a first through hole and comprising a water-stop mechanism arranged thereon, and a bottle lid having a second through hole and comprising a first connecting mechanism arranged thereon, wherein the flexible bottle further comprises a second connecting mechanism arranged in the vicinity of the opening, wherein the bottom opening, the nozzle, the second through hole, and the opening are aligned in order and selectively aligned to the first through hole or the water-stop mechanism according to the switching of the water switch, wherein the first connecting mechanism is movably coupled with the second connecting mechanism so as to movably couple the water switch unit with the flexible bottle in a water tight manner.

According to one embodiment, the water switch unit further includes a supplying pipe, wherein an end of the supplying pipe is communicated and connected with the second through hole.

According to one embodiment, the flexible bottle includes a lanyard detachably mounted thereon.

According to one embodiment, the flexible water bowl is made of a flexible material so as to be selectively flipped and inverted toward the flexible bottle to reduce a occupied space of the portable water bottle.

According to one embodiment, the flexible water bowl is made of an elastic material selected from the group consisting of rubber, flexible plastics, silicone, and combinations thereof.

According to one embodiment, the flexible bottle is made of an elastic material so as to allow the water contained therein to be discharged therefrom through squeezing the flexible bottle.

According to one embodiment, the predetermined depth is 2 cm and the predetermined angle is 15 degrees.

Appreciate to the above technologies, the present invention is capable of reducing the issues of oversized product and logistics and transportation. When the flexible bottle is filled with water, the user may open the water switch unit, squeeze the bottle to have the water pumped up into the flexible water bowl slowly, and incline the bottle in various angles to feed water for the pet. The user may also adjust and lock the water volume according to the needs. After the water feeding, the user may close the water switch unit and selectively flip and invert the flexible water bowl to fold and store it, so as to save the storage space.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 3:
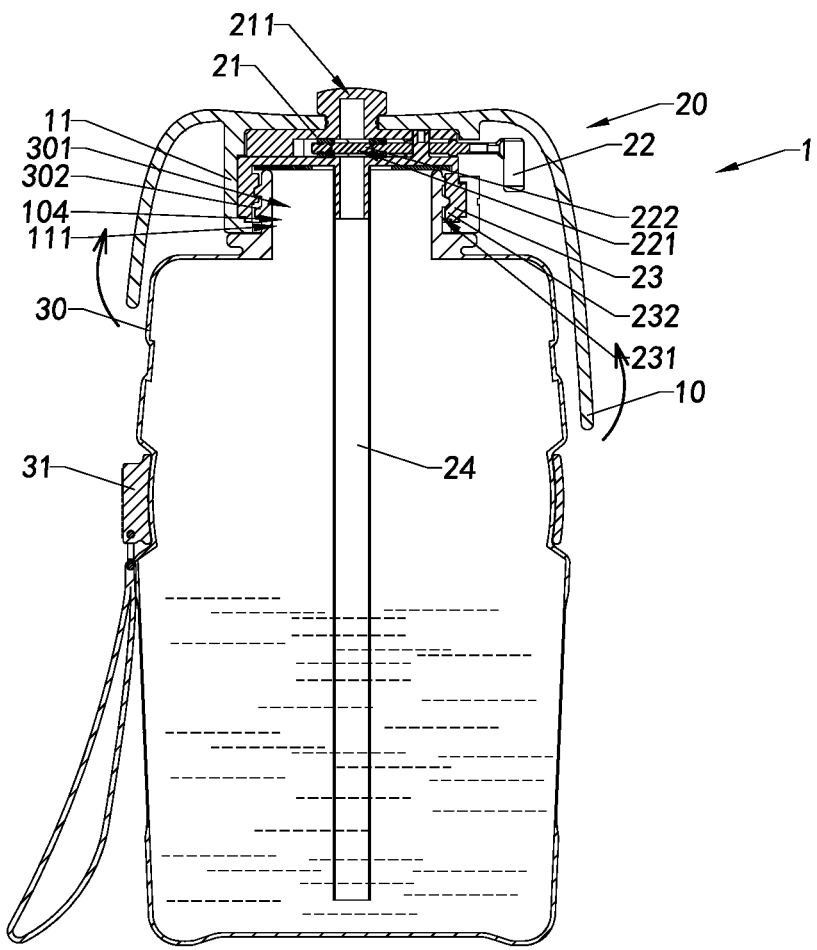
FIG. 3 is a sectional view illustrating the flexible water bowl of the portable water bottle for pet in a close state and being flipped and inverted according to the above preferred embodiment of the present invention.
Figure 4:
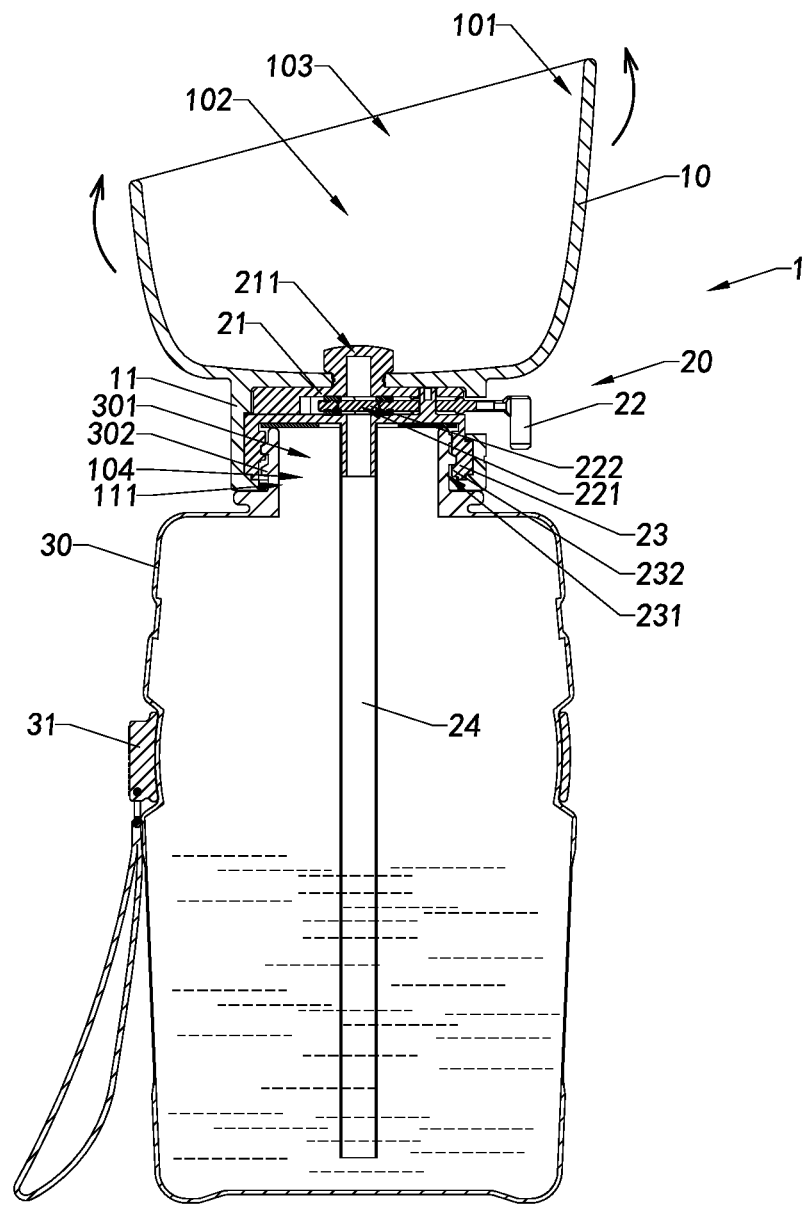
FIG. 4 is a sectional view illustrating the flexible water bowl of the portable water bottle for pet in a close state and being flipped back according to the above preferred embodiment of the present invention.
Figure 5:
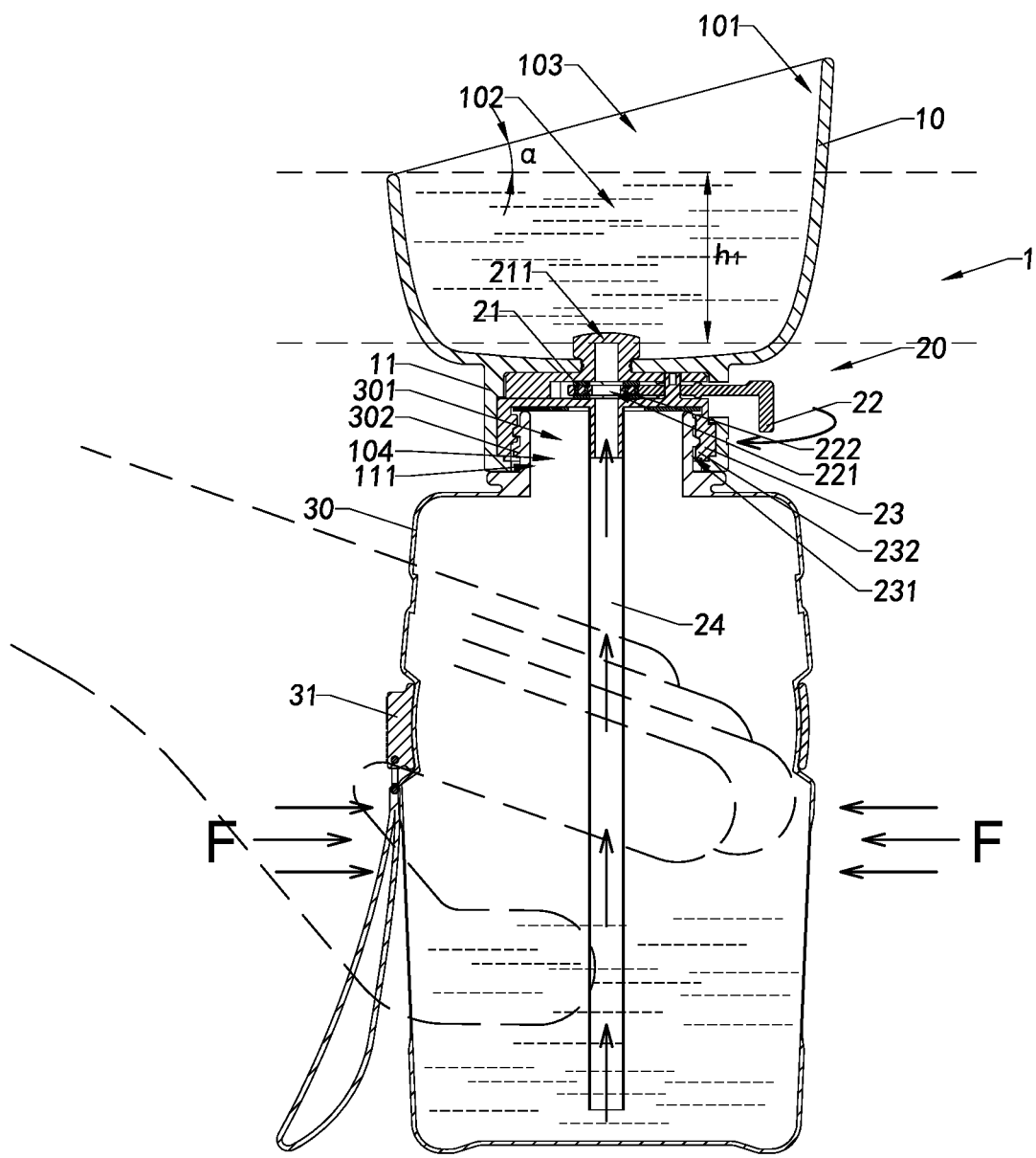
FIG. 5 is a sectional view illustrating the portable water bottle for pet being switched to an open state and squeezed to pump water up to the flexible water bowl thereof according to the above preferred embodiment of the present invention.
Figure 6:
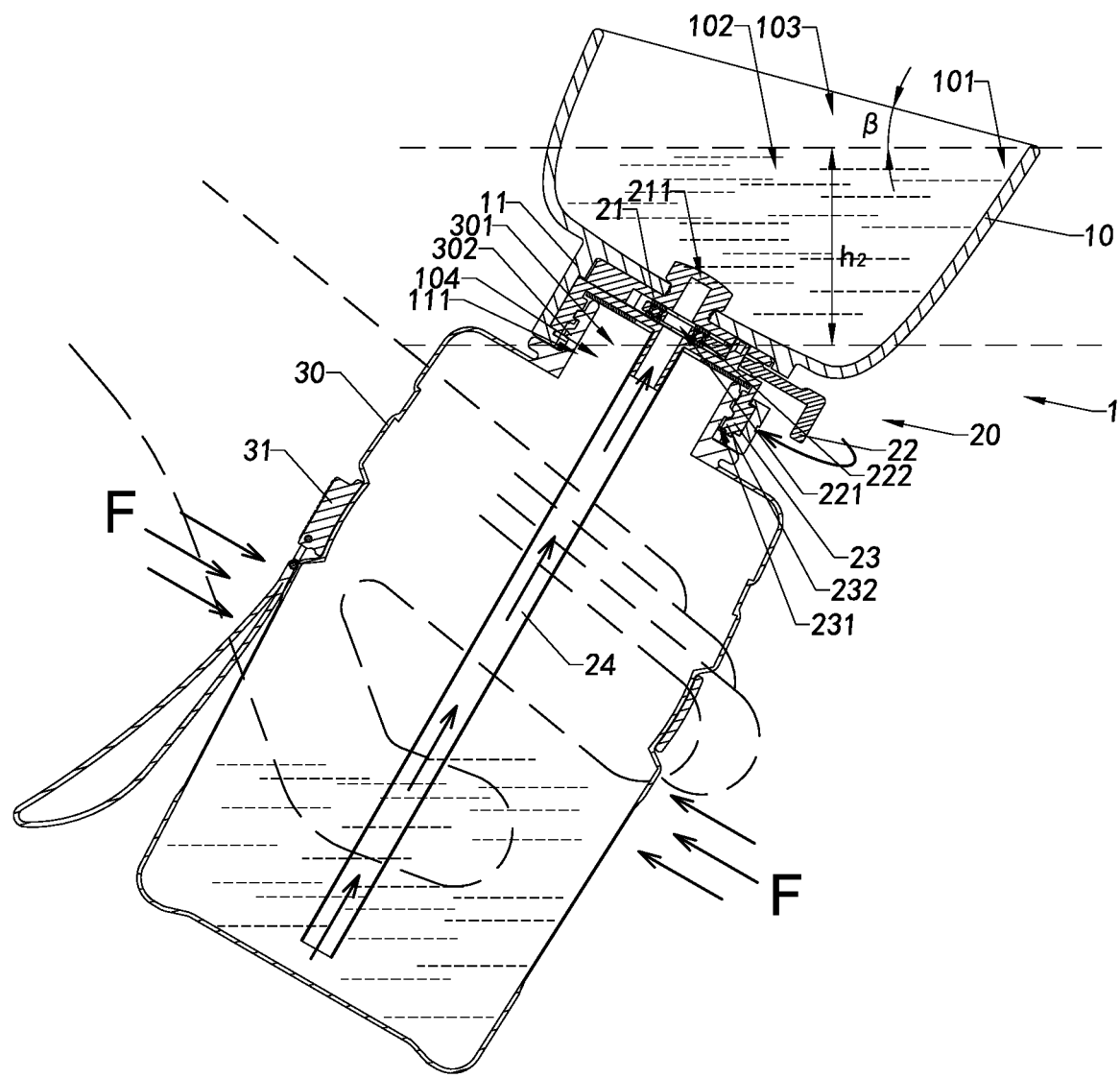
FIG. 6 is a sectional view illustrating the flexible water bowl filled with water and inclined according to the above preferred embodiment of the present invention.
Figure 7:
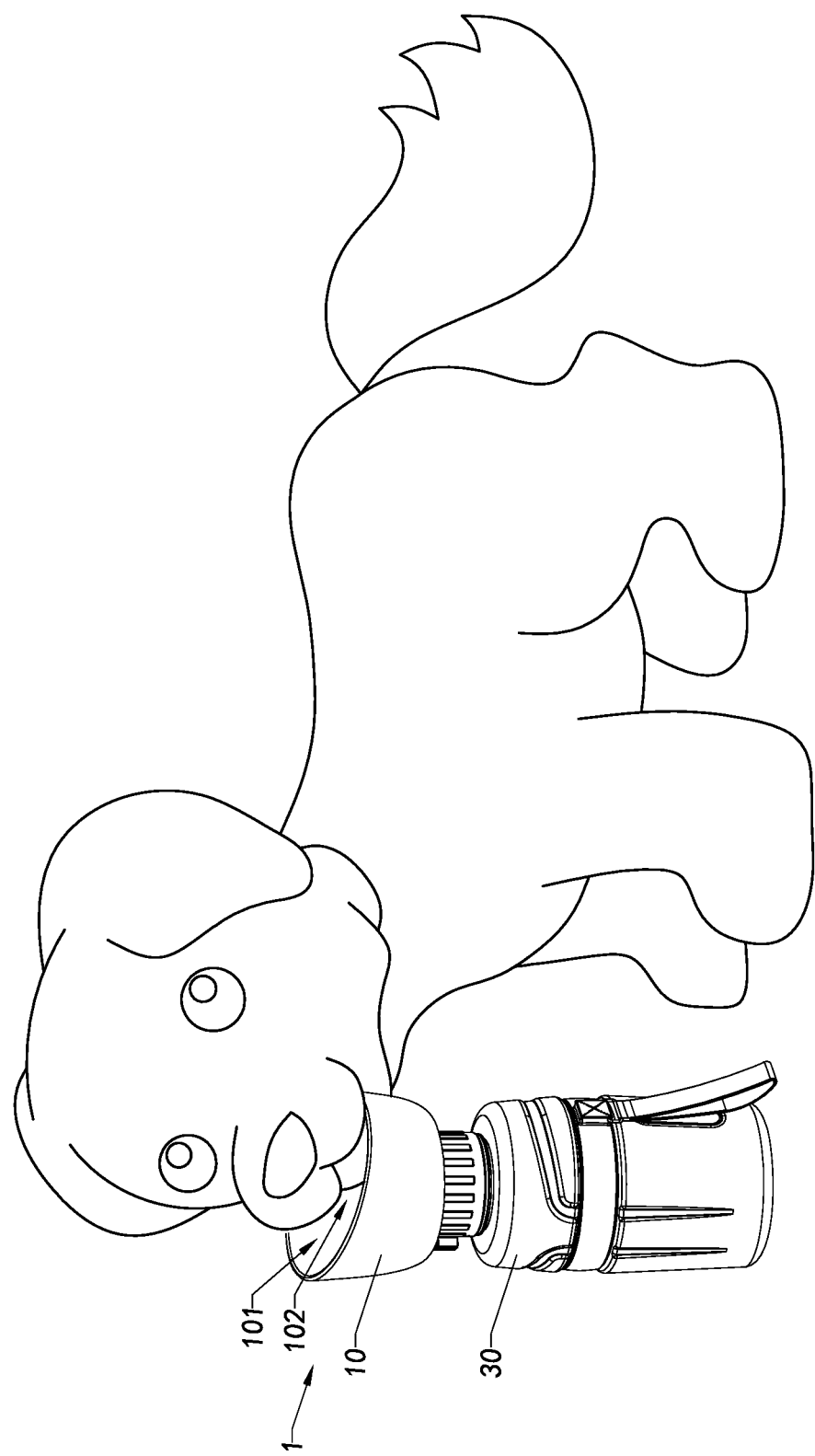
FIG. 7 is a schematic view illustrating an application of the portable water bottle for pet in an upright manner according to the above preferred embodiment of the present invention.
Figure 8:
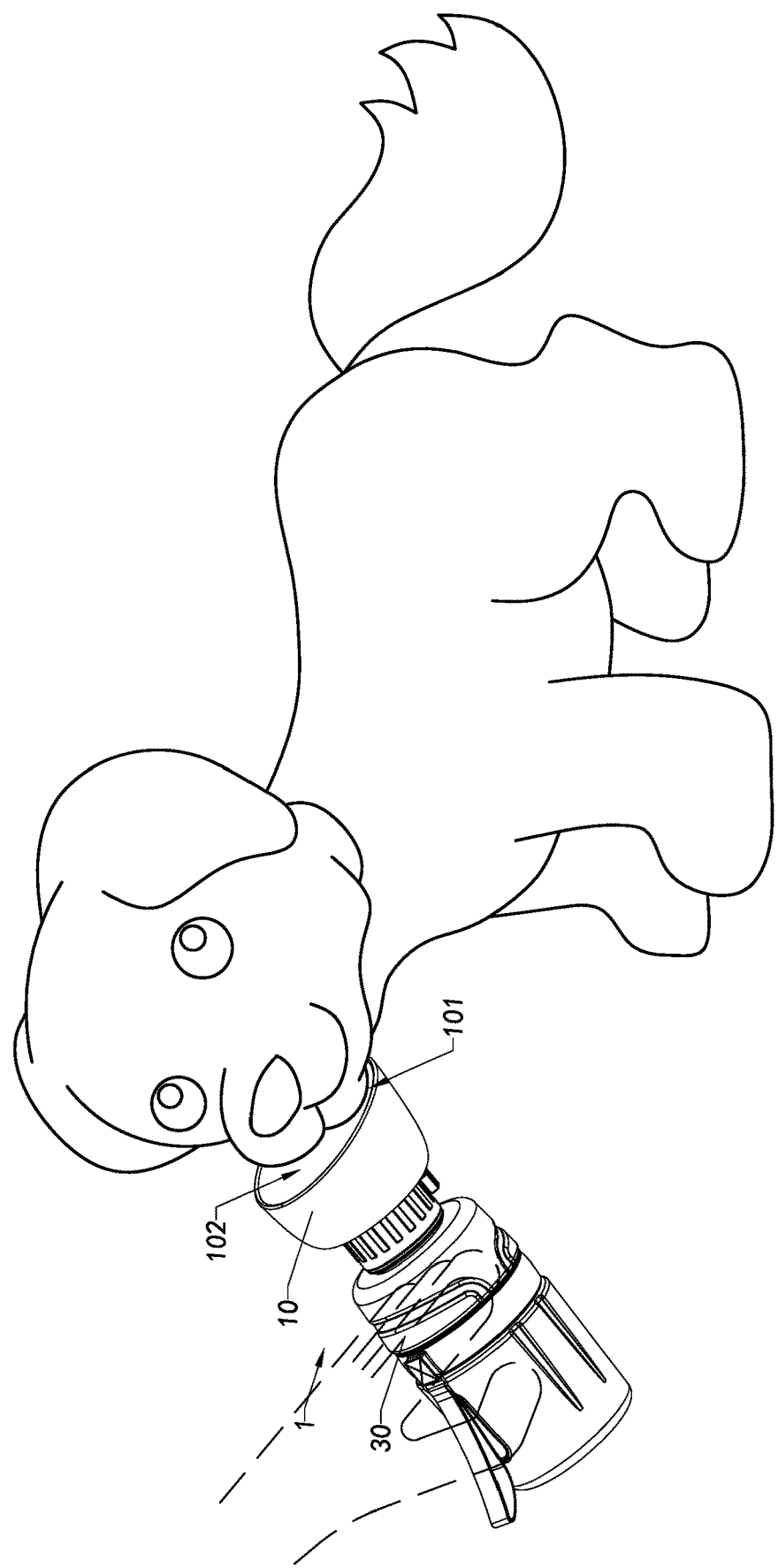
FIG. 8 is a schematic view illustrating another application view of the portable water bottle for pet being held in an inclined manner according to the above preferred embodiment of the present invention.
Figure 9:
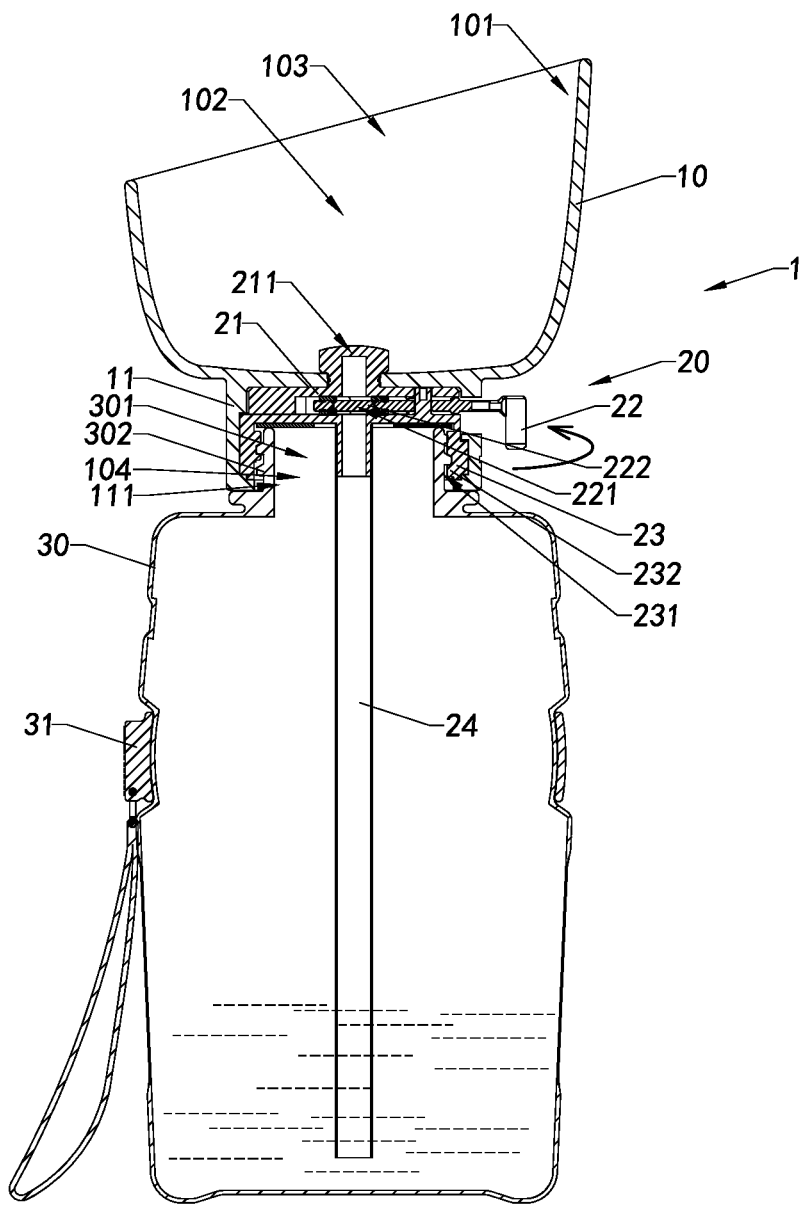
FIG. 9 is a sectional view illustrating the portable water bottle for pet switched to a close state according to the above preferred embodiment of the present invention.

Referring to FIGS. 1-10, the present invention provides a portable water bottle 1 for pet, which includes a flexible water bowl 10 having an upper rim 101, an internal space 102 defined therein, a top opening 103, and a bottom opening 104. The portable water bottle 1 comprises a water switch unit 20, adapted to be switched to an open state or a close state to respectively allow or prevent passing through of water, and a flexible bottle 30 having an opening 301 and comprising a second connecting mechanism 302 arranged in the vicinity of and surrounding the opening 301. The top opening 103 allows the pet to access the water contained in the flexible water bowl 10. The upper rim 101 is provided in an inclined and wide opening manner, so as for a pet, such as a dog and etc., to easily access the water contained in the flexible water bowl 10, especially through licking. Specifically, the inclined configuration of the upper rim 101 is in the manner that ensures the internal space 102 to have at least a predetermined depth h1/h2 while the flexible water bowl 10 is upright to oblique within a predetermined angle $\alpha/\beta$, as illustrated in FIGS. 5-6 (noted that $\alpha$ equals to $\beta$ and h1 equals to h2). Therefore, it allows the user/pet owner to simply hold the portable water bottle in an inclined manner and remain standing or with a slight bend down rather than to squat while water feeding the pet, as illustrated in FIG. 8. Preferably, the predetermined angle $\alpha/\beta$ is 15 degrees, which is suitable for achieving the above mentioned operation in general. Nevertheless, some other angles may also serve to perform a better function in some other scenarios and/or for users of various heights or physical characters/conditions. Therefore, the predetermined angle α for the present invention shall not be limited.

It is worth mentioning that some pet, such as a dog and etc., usually licks to drink, which requires a minimum depth of water to optimize the drinking activity of the pet. For a dog, as an example, in average, an optimal depth of water is 2 cm. Hence, preferably, the predetermined depth h1/h2 mentioned above is embodied as 2 cm. IN particular, according to the above preferred embodiment, the configurations of the upper rim 101 and the internal space 102 ensure an at least 2 cm depth of the internal space 102 while the flexible water bowl 10 is upright to oblique within 15 degrees (i.e. 0-15 degree tilt from the upright position), so as to allow the user to water feed the pet in various ways while still allows the pet to drink the water easily. Once the pet is able to drink the water easily, the pet is less likely to spill the water due to frustration and inconvenience and is likely to finish drinking more quickly, which further saves the user's effort in water feeding as well as cleaning. Nonetheless, some other depths may also serve to perform a better function in some other scenarios and/or for some other pets. Therefore, the predetermined depth for the present invention shall not be limited.

It is also worth mentioning that when the user is able to hold the portable water bottle 1 obliquely when feeding water, it reduce the risk of having the water and the pet's saliva dropping on the user's hand since the user's hand is not right below the pet's mouth. Hence, this arrangement also reduces certain hygiene concern for the user.

The bottom opening 104 is provided in a bottom of the flexible water bowl 10 so as for allowing the water stored in the flexible bottle 30 to be entered into the flexible water bowl 10. The flexible water bowl 10 is made of elastic material, such as rubber, flexible plastics, silicone, and etc.

Figure 1:
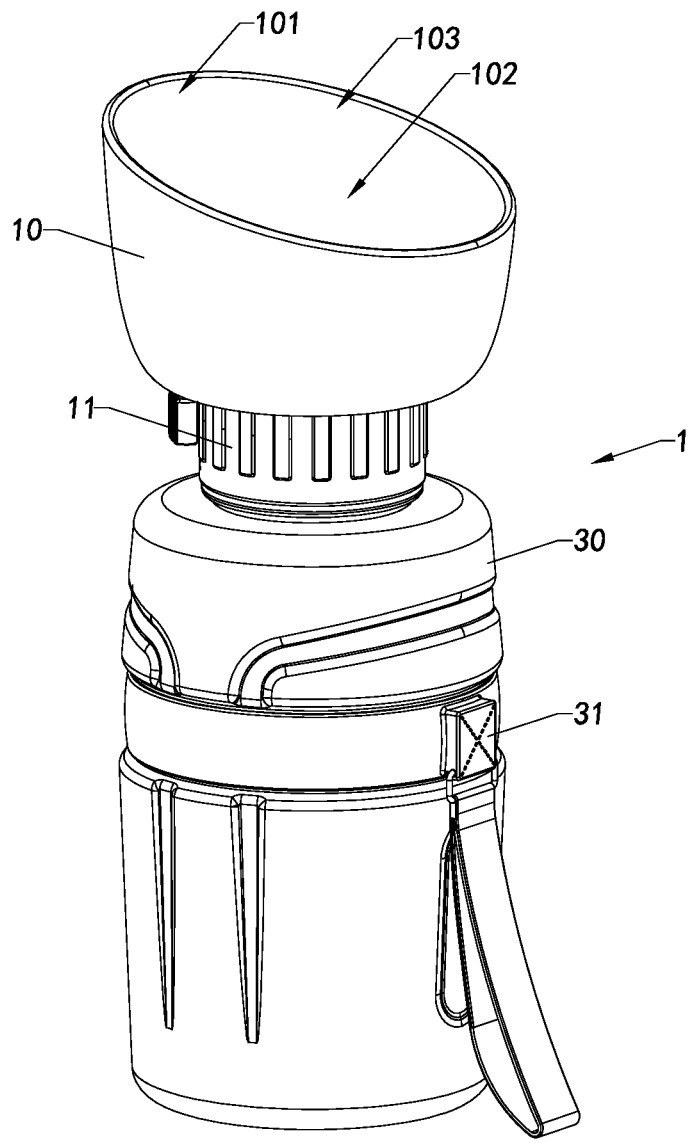
FIG. 1 is a perspective view of a portable water bottle for pet according to a preferred embodiment of the present invention.
Figure 2:
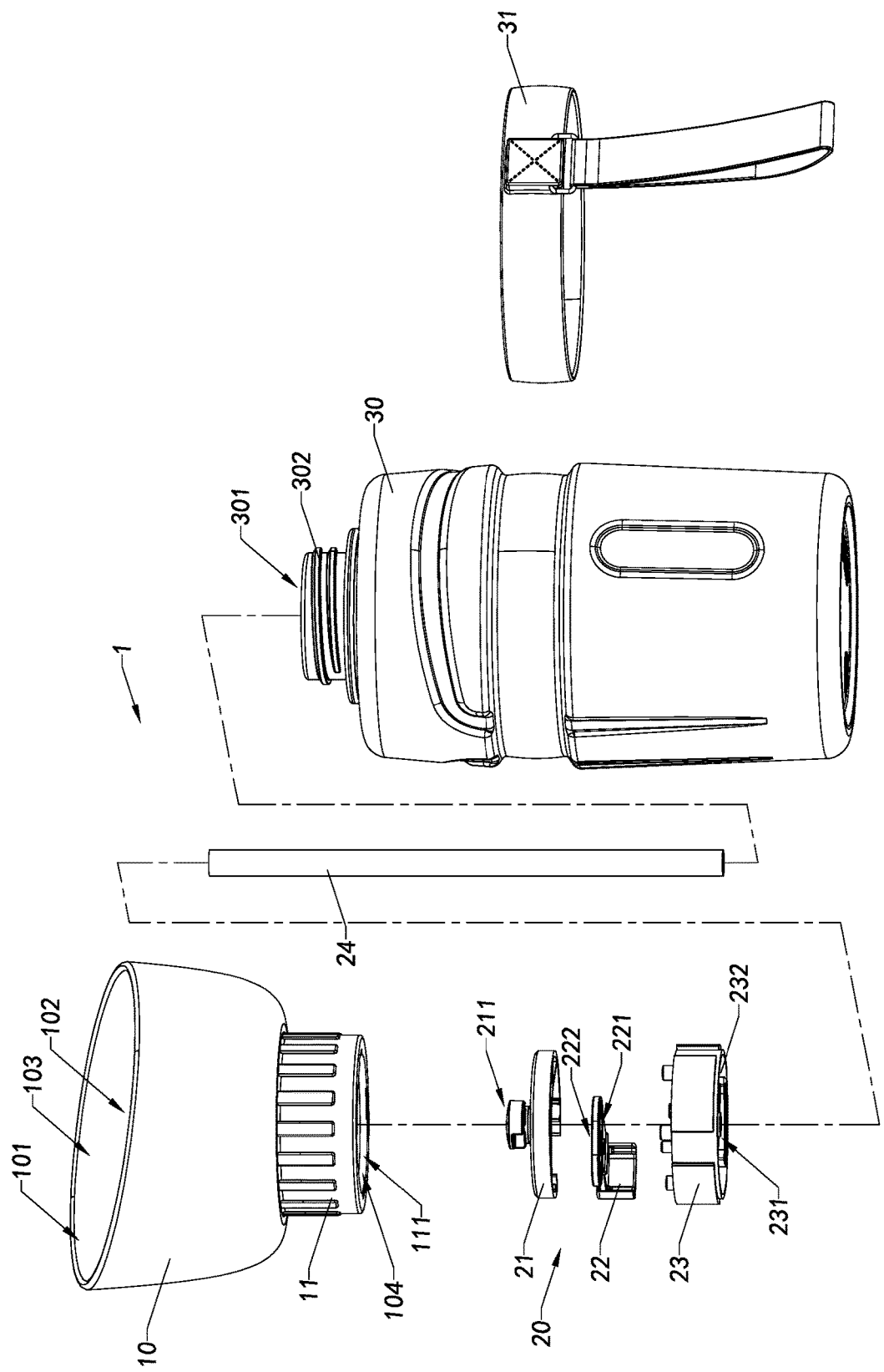
FIG. 2 is an exploded perspective view of the portable water bottle for pet according to the above preferred embodiment of the present invention.

The flexible water bowl 10 comprises a connecting member 11, arranged around the bottom opening 104. The connecting member 11 has an accommodating space 111 defined therein for accommodating, covering, holding, and connecting the water switch unit 20 and the opening 301 of the flexible bottle 30, as shown in FIGS. 2 and 3. The water switch unit 20 comprises a water output member 21 providing a nozzle 211 arranged thereon, a water switch 22 having a first through hole 221 and comprising a water-stop mechanism 222 arranged thereon, a bottle lid 23 having a second through hole 231 and comprising a first connecting mechanism 232 arranged thereon, and a supplying pipe 24. The flexible bottle 30 comprises a lanyard 31 detachably mounted thereon, so as to optionally provide a hand-carry aid for the user.

To assemble the portable water bottle 1 for pet, the water output member 21, the water switch 22, and the bottle lid 23 of the water switch unit 20 are aligned and assembled in order, wherein the water switch unit 20 is held in the accommodating space 111 in such a manner that the bottom opening 104, the nozzle 211, the first through hole 221, the second through hole 231 are aligned in order, wherein the water switch 22 is shiftable so as to replacingly shift the water-stop mechanism 222 to the position of the first through hole 221 in order to switch the configuration from an open state to a close state to stop the water way.

The first connecting mechanism 232 of the bottle lid 23 is adapted for being removably coupled and locked with the second connecting mechanism 302 of the flexible bottle 30 so as for water tightening and sealing the opening 301 of the flexible bottle 30 and preventing the water contained in the flexible bottle 30 from leaking therefrom. When the first connecting mechanism 232 of the bottle lid 23 is removably coupled with the second connecting mechanism 302 of the flexible bottle 30 and the water output member 21, the water switch 22, and the bottle lid 23 of the water switch unit 20 are assembled in order, aligned and held in the accommodating space 111, the water contained in the flexible bottle 30 is only allowed to leave the flexible bottle 30 through the second through hole 231 provided in the bottle lid 23 if the water switch 22 has switched to the open state. Otherwise, the water is completely sealed and kept in the flexible bottle 30.

Preferably, the first connecting mechanism 232 of the bottle lid 23 is connected with the second connecting mechanism 302 of the flexible bottle 30 through a screw thread mechanism, which is economic, easy to use, and excellent in water tight performance. Nevertheless, according to some other embodiments, the first connecting mechanism 232 and the second connecting mechanism 302 may also be implemented differently, such as some air-tight buckling configurations, and etc. As long as the first connecting mechanism 232 and the second connecting mechanism 302 are capable of being removably coupled, engaged or connected with each other in a water tight manner, it shall still be within the scope of the present invention and the present invention shall not be limited hereby.

When the portable water bottle 1 for pet is assembled properly and switched to the open state, the bottom opening 104, the nozzle 211, the first through hole 221, the second through hole 231, the supplying pipe 24, and the opening 301 are all aligned in order, so as to allow the water contained in the flexible bottle 30 to enter the flexible water bowl 10. When the properly assembled portable water bottle 1 for pet is switched to the close state, the bottom opening 104, the nozzle 211, the water-stop mechanism 222, the second through hole 231, the supplying pipe 24, and the opening 301 are all aligned in order, so as to prevent the water contained in the flexible bottle 30 from entering the flexible water bowl 10.

Further, an end of the supplying pipe 24 of the water switch unit 20 is communicatingly connected with the second through hole 231 of the bottle lid 23 so as to assemble and affix the supplying pipe 24 on the bottle lid 23 and allow the water in the flexible bottle 30, especially when the water level is low, to be discharged from the flexible bottle 30 sequentially through the supplying pipe 24, the second through hole 231, the first through hole 221, the nozzle 211, and the bottom opening 104 into the flexible water bowl 10.

Preferably, the nozzle 211 of the water output member 21 is also coupled with the bottom opening 104 of the flexible water bowl 10 so as to not only aid the connection and assembling strength between the water switch unit 20 and the flexible water bowl 10, but also reinforce the seal of the flexible water bowl 10. In particular, the water in the flexible water bowl 10 will not leak from the gap between outer side of the nozzle 211 and the bottom opening 104 of the flexible water bowl 10. Nevertheless, the rims of the water output member 21, the water switch 22, and the bottle lid 23 and the inner wall of the connecting member 11 may also serve the same function jointly or independently.

According to the above technology, the present invention provides a portable water bottle 1 for pet, which particularly serves as a water utensil for pets and is suitable for both indoor and outdoor uses.

Figure 10:
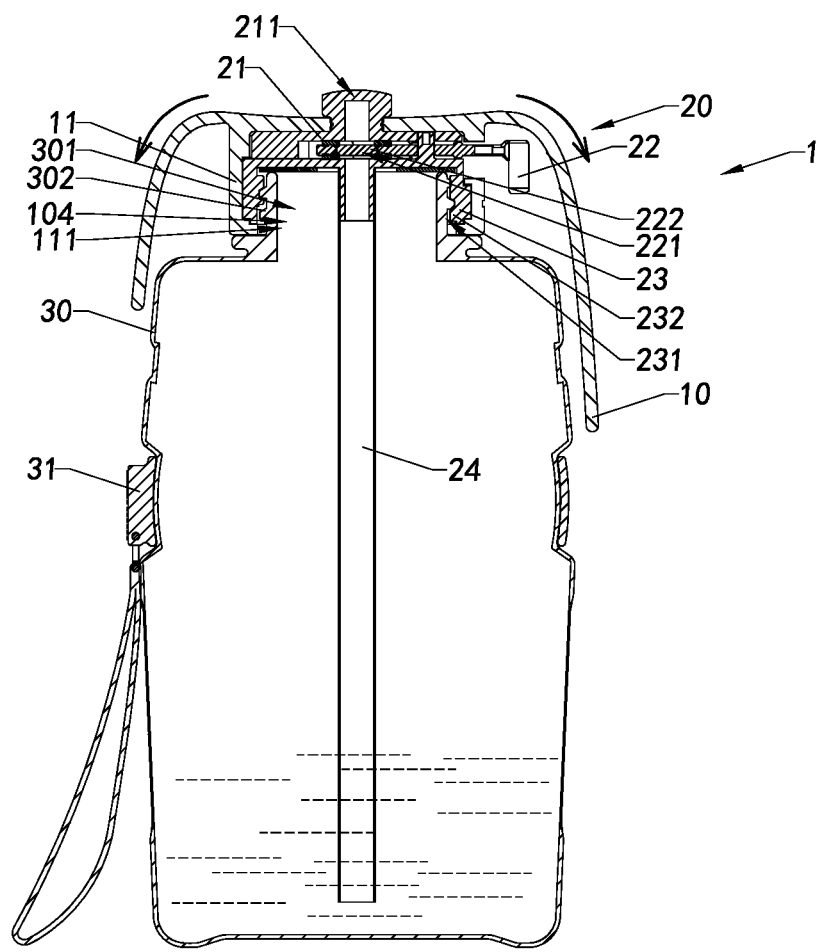
FIG. 10 is a sectional view illustrating the flexible water bowl being flipped and inverted according to the above preferred embodiment of the present invention.

Referring to FIGS. 3, 4, and 10, the flexible water bowl 10 is capable of being flipped and inverted for storage in a folded manner, wherein the inclination and/or radian of the bowl mouth is suitable for water feeding. Besides, it reduces the issues of logistics and transportation and solves the storage problem of the conventional pet water bowl. The water switch 22 of the present invention may be switched in a left and right manner, in an up and down manner, or in a push-key manner, to serve to lock and open the supply of water. The water switch unit provides a solution for quick open/close of the watering function for pet water utensil, which provides a friendly environmental and integral sealing product.

The water output member 21 has a water outlet for discharging water. The water switch 22 is embodied as a switching bar, which is an integrally formed sealing member made of thermostable material and friendly environmental silicone. The switching bar 22 has a sealed hole and a water hole arranged therein. The water output member 21 is also embodied as a sealing cover that has screw thread(s) arranged on the inner side thereof for being screwed or buckled at the opening of the flexible bottle 30 to seal the opening. In addition, the supplying pipe 24 of the flexible bottle 30 is connected to the inner side of the water output member 21 so as to allow water to be output through the supplying pipe 24 and the water output member 21 when the water switch 22 is switched to the water position or open state.

When the water switch 22 is in the water position, the water switch unit 20 is in an open state, so that when the flexible bottle 30 is squeezed, the water in the flexible bottle 30 will be discharged through the supplying pipe 24 and the water output member 21 into the flexible water bowl 10 so as for feeding water for the pet. When the water switch 22 is in the seal position or close state, the water switch unit 20 is sealed and closed and the flexible water bowl 10 can optionally further be flipped and inverted for storage, which eases the difficulties of storing and carrying the bottle, as illustrated in FIG. 10.

When one is to incline the bottle and feed the pet water, the water switch unit 20 can be switched to the water position or open state, so that when the flexible bottle 30 can be squeezed to pump and output the water in the flexible bottle 30 through the supplying pipe 24 and the water output member 21 into the flexible water bowl 10. Then the inclination and/or radian of the bowl mouth of the flexible water bowl 10 allows the pet to access and drink water easier. When the water switch unit 20 is switched to the seal position or close state, the bottle is closed. At this moment, the water-stop mechanism 222, which may be embodied as a sealed hole, blind hole, or other structure, is aligned with the nozzle 221 and the second through hole 231 so that the water is prevented from passing through the water switch unit 20.

Appreciate to the above technologies, the present invention is capable of reducing the issues of oversized product and logistics and transportation. When the flexible bottle 30 is filled with water, the user may open the water switch unit 20, squeeze the flexible bottle 30 to have the water pumped up into the flexible water bowl 10 slowly, and incline the flexible bottle 30 in various angles to feed water for the pet. The user may also adjust and lock the water volume based on the needs. After the water feeding, the user may close the water switch unit 20 and flip and invert the flexible water bowl 10 to fold and store it, so as to save the storage space.

It is worth mentioning that some pets, such as dogs, usually drink through licking and, as a result, need relatively deep water in the bowl as well as an inclined bowl mouth to facilitate their licking and drinking activity. Conventionally, a home-use bowl is capable of serving this function based on its wide bowl mouth and high water level (i.e. contained more water therein). Unfortunately, considering of a compact size and light weight, a portable water device is mostly not allowed to have a large size or to provide too much water in order to allow the pet just to drink some of it. Hence, an advantage of the present invention is to provide a portable water bottle 1 for pet with a flexible water bowl 10 of an inclined bowl mouth, such that the pet is able to lick and drink a limited amount of water from a sufficient distance for licking as well as a suitable and friendly angle for licking, which also helps to prevent water wasting due to unfriendly water feeding arrangement and therefore enhances the water feeding efficiency as well.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A portable water bottle for pet, comprising:
a flexible bottle having an opening and comprising a first connecting mechanism arranged in a vicinity of and surrounding said opening;
a flexible water bowl having an upper rim provided in an inclined manner, an internal space defined therein, a top opening defined by said upper rim, and a bottom opening provided in a bottom of said flexible water bowl, wherein said flexible water bowl further comprises a connecting member arranged around said bottom opening and defined an accommodating space therein; and
a water switch unit, being accommodated and connected in said accommodating space of said connecting member of said flexible water bowl, comprising:
a water output member coupled with said bottom opening of said flexible water bowl to mount said flexible water bowl on top of said flexible bottle coaxially and provides a nozzle arranged thereon and extended to said bottom of said flexible water bowl,
a water switch having a first through hole and comprising a water-stop mechanism arranged in said first through hole and a switching element extended between said flexible bottle and said flexible water bowl outside said connecting member, wherein said water switch is shiftable between an open state and a close state,
a bottle lid having a second through hole and comprising a second connecting mechanism arranged thereon and detachably connected with said first connecting mechanism of said flexible bottle coaxially, such that said water output member, said water switch and said bottle lid of said water switch unit are aligned and assembled in order, wherein said water switch unit is held in said accommodating space in such a manner that said bottom opening, said nozzle, said first through hole, and said second through hole are aligned in order, and
a supplying pipe having a low end extended to a lower portion in said flexible bottle and an upper end communicatingly connected with said through hole of said bottle lid so as to assemble and affix said supplying pipe on said bottle lid to allow a water in said flexible bottle to be discharged from said flexible bottle sequentially through said supplying pipe, said second through hole, said first through hole, said nozzle and said bottom opening into said flexible water bowl, wherein when said water-stop mechanism positioned between said flexible water bowl and said flexible bottle is shifted by said switching element to the open state, said bottom opening, said nozzle, said first through hole, said second through hole, said supplying pipe, and said opening are aligned in order to allow the water contained in said flexible bottle while said flexible bottle is being squeezed to pump and output the water in said flexible bottle through said supplying pipe to enter said flexible water bowl through said second through hole, said first through hole, and said nozzle for the pet to drink while the portable water bottle is held in an upright position, wherein when said water-stop mechanism is shifted by said switching element to the close state, said water-top mechanism is aligned with said bottom opening, said nozzle, said second through hole, said supplying pipe, and said opening so as to prevent the water contained in said flexible bottle from passing through said water switch unit into said flexible water bowl.

2. The portable water bottle, as recited in claim 1, wherein said internal space has at least a predetermined depth h1 while said flexible water bowl is in the upright position and said upper rim of said flexible water bowl has a predetermined inclination angle α and at least a predetermined depth h2 while said flexible water bowl is an oblique position and said upper rim of said flexible water bowl has a predetermined inclination angle β.

3. The portable water bottle, as recited in claim 2, wherein each of said predetermined inclination angle α and said predetermined inclination angle β is 15 degrees.

4. The portable water bottle, as recited in claim 2, wherein each of said predetermined depth h1 and h2 is 2 cm.

5. The portable water bottle, as recited in claim 3, wherein each of said predetermined depth h1 and h2 is 2 cm.

6. The portable water bottle, as recited in claim 1, wherein said flexible water bowl is made of elastic material and capable of being flipped and inverted around an upper portion of said flexible bottle for storage in a folded manner.

7. The portable water bottle, as recited in claim 2, wherein said flexible water bowl is made of elastic material and capable of being flipped and inverted around an upper portion of said flexible bottle for storage in a folded manner.

8. The portable water bottle, as recited in claim 3, wherein said flexible water bowl is made of elastic material and capable of being flipped and inverted around an upper portion of said flexible bottle for storage in a folded manner.

9. The portable water bottle, as recited in claim 4, wherein said flexible water bowl is made of elastic material and capable of being flipped and inverted around an upper portion of said flexible bottle for storage in a folded manner.

10. The portable water bottle, as recited in claim 5, wherein said flexible water bowl is made of elastic material and capable of being flipped and inverted around an upper portion of said flexible bottle for storage in a folded manner.

11. The portable water bottle, as recited in claim 1, wherein said nozzle of said water output member is coupled with said bottom opening of said flexible water bowl so as to aid a connection and assembling strength between said water switch unit and said flexible water bowl and reinforce a seal of said flexible water bowl, wherein said second connection mechanism of said bottle lid is configured to be removably coupled and locked with said first connecting mechanism of said flexible bottle so as for tightening and sealing said opening of said flexible bottle.

12. The portable water bottle, as recited in claim 5, wherein said nozzle of said water output member is coupled with said bottom opening of said flexible water bowl so as to aid a connection and assembling strength between said water switch unit and said flexible water bowl and reinforce a seal of said flexible water bowl, wherein said second connection mechanism of said bottle lid is configured to be removably coupled and locked with said first connecting mechanism of said flexible bottle so as for tightening and sealing said opening of said flexible bottle.

13. The portable water bottle, as recited in claim 6, wherein said nozzle of said water output member is coupled with said bottom opening of said flexible water bowl so as to aid a connection and assembling strength between said water switch unit and said flexible water bowl and reinforce a seal of said flexible water bowl, wherein said second connection mechanism of said bottle lid is configured to be removably coupled and locked with said first connecting mechanism of said flexible bottle so as for tightening and sealing said opening of said flexible bottle.

14. The portable water bottle, as recited in claim 10, wherein said nozzle of said water output member is coupled with said bottom opening of said flexible water bowl so as to aid a connection and assembling strength between said water switch unit and said flexible water bowl and reinforce a seal of said flexible water bowl, wherein said second connection mechanism of said bottle lid is configured to be removably coupled and locked with said first connecting mechanism of said flexible bottle so as for tightening and sealing said opening of said flexible bottle.

15. The portable water bottle, as recited in claim 1, wherein said switching element of said water switch is a switching bar having a sealed hole and a water hole arranged therein, wherein said water output member is a sealing cover screwed at said opening of said flexible bottle to seal said opening.

16. The portable water bottle, as recited in claim 5, wherein said switching element of said water switch is a switching bar having a sealed hole and a water hole arranged therein, wherein said water output member is a sealing cover screwed at said opening of said flexible bottle to seal said opening.

17. The portable water bottle, as recited in claim 6, wherein said switching element of said water switch is a switching bar having a sealed hole and a water hole arranged therein, wherein said water output member is a sealing cover screwed at said opening of said flexible bottle to seal said opening.

18. The portable water bottle, as recited in claim 10, wherein said switching element of said water switch is a switching bar having a sealed hole and a water hole arranged therein, wherein said water output member is a sealing cover screwed at said opening of said flexible bottle to seal said opening.

19. The portable water bottle, as recited in claim 12, wherein said switching element of said water switch is a switching bar having a sealed hole and a water hole arranged therein, wherein said water output member is a sealing cover screwed at said opening of said flexible bottle to seal said opening.

20. The portable water bottle, as recited in claim 14, wherein said switching element of said water switch is a switching bar having a sealed hole and a water hole arranged therein, wherein said water output member is a sealing cover screwed at said opening of said flexible bottle to seal said opening.

* * * * *